United States Patent
Couch et al.

(10) Patent No.: US 6,167,951 B1
(45) Date of Patent: Jan. 2, 2001

(54) HEAT EXCHANGER AND METHOD OF PURIFYING AND DETOXIFYING WATER

(76) Inventors: Harold Thompson Couch; Harold Matthew Couch, both of 15 Talcott Mountain Rd., Simsbury, CT (US) 06070

( * ) Notice: Under 35 U.S.C. 154(b), the term of this patent shall be extended for 0 days.

(21) Appl. No.: 09/237,355

(22) Filed: Jan. 26, 1999

(51) Int. Cl.[7] .................................................. F28D 7/00
(52) U.S. Cl. .......................................... 165/160; 165/159
(58) Field of Search .................................. 165/158, 159, 165/160; 422/201; 122/32

(56) References Cited

U.S. PATENT DOCUMENTS

| | | | |
|---|---|---|---|
| 1,226,299 | * 5/1917 | Boltz | 165/159 |
| 1,517,673 | * 12/1924 | Eberle | 165/159 |
| 1,771,160 | * 7/1930 | Chapman | 165/159 |
| 1,798,354 | 3/1931 | Ris . | |
| 2,049,748 | * 8/1936 | Rathbun | 165/159 |
| 2,062,321 | * 12/1936 | Levin | 165/159 |
| 2,519,084 | 8/1950 | Tull | 257/236 |
| 2,625,138 | 1/1953 | Jacoby | 122/17 |
| 3,212,566 | 10/1965 | Karassik et al. | 165/66 |
| 3,587,732 | 6/1971 | Burne | 165/158 |
| 3,741,164 | * 6/1973 | Barratt | 165/159 |
| 3,760,870 | 9/1973 | Guethlhuber | 165/35 |
| 3,901,659 | 8/1975 | Joklik et al. | 23/288 |
| 4,014,295 | * 3/1977 | Lions | 165/160 |
| 4,127,389 | * 11/1978 | Hackemesser et al. | 165/159 |
| 4,357,991 | 11/1982 | Cameron | 165/159 |
| 4,676,908 | 6/1987 | Ciepiela et al. | 210/638 |
| 4,861,489 | 8/1989 | Swift et al. | 210/668 |
| 5,044,431 | 9/1991 | Cameron | 165/158 |
| 5,161,605 | * 11/1992 | Guthuber | 165/160 |
| 5,277,247 | 1/1994 | Cameron | 165/159 |
| 5,291,944 | * 3/1994 | Sanz et al. | 165/159 |
| 5,615,738 | 4/1997 | Cameron et al. | 165/103 |
| 5,653,282 | 8/1997 | Hackemesser et al. | 165/134.1 |

* cited by examiner

Primary Examiner—Ira S. Lazarus
Assistant Examiner—Terrell McKinnon
(74) Attorney, Agent, or Firm—Smith Gambrell & Russell, LLP

(57) ABSTRACT

A radial flow regenerative counter flow heat exchanger includes a) a shell; b) a plurality of large circular baffle plates aligned coaxially within the shell and extending to an inner wall of the shell, defining at least one circular hole therein; c) a plurality of small circular baffle plates aligned coaxially within the shell, and alternately spaced from and coaxially positioned relative to each of the large circular baffle plates; d) a plurality of symmetrically-arranged tubes positioned perpendicular to the small baffle plates and the large baffle plates forming at least one coaxial tube bundle extending through the small baffle plates and large baffle plates, wherein an inner radius of the innermost tube row of the tube bundle is larger than a radius of the circular hole in the large baffle plate and the outer radius of the outermost tube row is smaller than a radius of the small baffle plates, and wherein the small baffle plate defines at least one space outside the tube bundle, and e) a heat transfer coefficient which is the same or nearly the same for all tubes. This heat exchanger can be used in a water treatment apparatus for economically killing pathogenic microorganisms harmful to humans or animals in water, and economically purifying water in conjunction with a catalytic wet oxidation reactor to remove organic contaminants.

45 Claims, 8 Drawing Sheets

Close-Up Showing Outflow through 14 Row Tube Bank
( constant gap width between nearest neighbors on adjacent tube row )

HEAT EXCHANGER AND METHOD OF PURIFYING AND DETOXIFYING WATER

FIELD OF THE INVENTION

The invention relates to a regenerative heat exchanger that can be used in a flow-through water treatment system to kill pathogenic microorganisms.

INTRODUCTION AND BACKGROUND OF THE INVENTION

In dire personal need water can be purified by boiling. Boiling kills microorganisms hazardous to human beings. However, the energy cost of boiling large quantities of water for municipalities or other large-scale requirements is exorbitant, and unless continued over a period of 15 minutes or more, it does not necessarily destroy all pathogens potentially harmful to humans or fish and it does not remove inorganic minerals or any organic contaminants.

However, if instead of simply boiling the water, the water is passed through a heat exchanger, the process would be advantageously efficient. Patents that describe various heat exchangers are discussed below.

Cameron, U.S. Pat. No. 4,357,991 recognizes the intrinsic high efficiency of the disk and donut baffle configuration in shell and tube heat exchangers, but U.S. Pat. No. 4,357,991 requires an equal diagonal spacing between all tubes and their nearest neighbors on adjacent rows and a minimum tube-to-tube separation of twice this distance between tubes on the innermost row. This causes the incurrence of a larger unproductive void volume in the center of the heat exchanger than the configuration which is the subject of the present work. We have found, at least in the turbulent flow regime where operation is most economic, that twice the diagonal tube-to-tube spacing distance between tubes in the first row is not required or even desirable. Such configuration is not desired because tubes in the first row have only two nearest neighbors instead of four and therefore unless the spacing between tubes on the first innermost row is less than twice the diagonal spacing between a tube on the first row and its nearest neighbors on the second row the heat exchange is not balanced and the tubes in the first row become less effective than the tubes on other interior rows. The desired design configuration is one where the external heat transfer coefficient is the same or nearly the same for all tubes and not necessarily an equal spacing between all tubes and their nearest neighbors on adjacent tube rows. The mistaken requirement, for the purposes of obtaining uniform or near uniform heat transfer, that the spacing between tubes in the innermost row be twice the diagonal spacing between each tube and its nearest neighbors on the second adjacent tube row diminishes the number of tubes which can be inserted within a given shell volume, and accordingly limits heat transfer. As subsequently noted in Cameron in U.S. Pat. No. 5,044,431 in col. 1 lines 46–53 there is a problem with the economy of the tube spacing in U.S. Pat. No. 4,357,991 and;

Although the approach in the Cameron patent [U.S. Pat. No. 4,357,991] allows a second family of rings [tube rows] to be placed outside the main series with smaller ligaments and more tubes per ring, the discontinuity caused by the change in the ring tubing density significantly moves the outer edge of the bundle outwardly and makes the heat exchanger larger. In addition there is a discontinuity in flow between the families of rings . . .

Also noted by Cameron in col. 4, lines 13–15 of U.S. Pat. No. 5,044,431 with regard to the tube spacing in the innermost tube ring;

can be designed so that [the spacing between tubes] in the two inner arcs, "b"=1.5a ["a" being the diagonal separation between each tube and its nearest neighbors in the adjacent tube rows], rather than 2a . . . While this will create a slightly increased pressure drop in the inner rings, this will not have a major effect on the performance of the heat exchanger.

U.S. Pat. No. 4,357,991 also fails to recognize or at least specify the much greater efficiency, and therefore desirability of operation in the all turbulent flow regime. We have found, especially for the regenerative heating of water, a fluid with high specific heat and low thermal conductivity, that: (1) operation in the all turbulent range becomes an economic necessity from a cost benefit point of view; and (2) for balanced or near equal heat transfer to every tube, which is an object of U.S. Pat. No. 4,357,991, the tube spacing between at least: the tubes on the first or innermost row should be less than twice the diagonal spacing between tubes and their closest neighbors on adjacent rows. Equal shell-side heat transfer to the tubes on the outermost tube row cannot be accomplished without inserting rods or other turbulence enhancing expedient to compensate for the fact that the tubes on the outermost row have only two nearest neighbors. However, this would also increase tube-bundle volume and entail additional fabrication cost. It is better to add one more tube row and accept ≈80% effectiveness from the tubes in the outermost row.

Finally, U.S. Pat. No. 4,357,991 fails to disclose the multiple parallel tube bundle configurations shown in FIGS. 4 and 5 of the present application, which comprises a more economic means of heat exchange within a single shell, and extends only to the specific design of a heat exchange element rather than high efficiency heat exchange as a component or means of thermal water purification and/or sterilization.

Cameron, in U.S. Pat. No. 5,044,431 claims another disk and donut baffle configuration for shell and tube heat exchangers, which is similar to U.S. Pat. No. 4,357,991. This configuration differs from the present invention in that the tubes are spaced on a multiplicity of arcs having centroids which are not coincident with the shell axis. The object of U.S. Pat. No. 5,044,431 is to minimize the unproductive core volume interior to the first row of tubes thereby enhancing the advantage of the disk and donut baffle configuration via a greater density of tube packing. However, the configuration of U.S. Pat. No. 5,044,431, somewhat defeats the uniformity of flow which U.S. Pat. No. 4,357,991 and the present work seek to capitalize upon. Beyond the general disk and donut baffle configuration, U.S. Pat. No. 5,044,431 does not present a geometry which is similar to that of the present work. Further, U.S. Pat. No. 5,044,431 is concerned with the specific design of the heat exchange element and not a high efficiency heat exchanger as a component of a thermal water purification and/or sterilization system.

Burne, U.S. Pat. No. 3,587,732, claims a heat exchange configuration where one fluid flows into the inner diameter of a large porous or skeletal metal tube and is forced to percolate from the inner to outer diameter while it receives heat from, or transfers heat to, a secondary fluid which is caused to flow through a parallel set of smaller tubes which are imbedded in and in close thermal contact with the porous or skeletal metal, as by brazing. Obviously the primary fluid flow could be from the outside diameter inward with essentially the same effectiveness. However, this configuration is a completely different heat transfer configuration than the flow configuration according to the invention. According to the present invention, the heat transfer is expedited by an efficient, uniform radial flow across, in general, a substantially greater number of small tubes and a suitable shell-side flow velocity and a high level or turbulence is achieved by utilizing a large number of baffle plates. In contrast, the heat transfer in Burne is expedient by enhanced thermal conduction available from a thermally conductive porous media such as a skeletal aluminum or copper matrix. The design and principle of operation of U.S. Pat. No. 3,587,732 are different from the present work.

In addition, the shell-side flow in the Burne configuration is radially symmetric but it is not a disk and donut configuration and therefore is different from the heat exchanger according to the invention. In Burne U.S. Pat. No. 3,587,732, the total shell-side flow makes only one radial pass: percolating from the central cavity through a thick, porous metal tube to a concentric outer collection chamber, or percolating from a concentric outer feed chamber through the porous metal tube to a central cavity collection chamber. Imbedded within the porous metal tube and with axes parallel to the main axis, are a number of smaller tubes containing the tube-side fluid flow. Because heat transfer from the shell-side fluid occurs via the porous metal media, acting as it were as fins on the tubes containing the tube-side flow, the shell-side heat transfer can be expected to be efficient. A disadvantage is that Burne's configuration does not rapidly lend itself to a high density of imbedded tubes, as in the heat exchanger according to the invention, and performance is critically dependent upon a high degree of uniformity in the porosity of the matrix material which is necessary to ensure an even distribution of the shell-side flow.

Hackemesser et al., in U.S. Pat. No. 5,653,282, suggest an apparatus useful for attenuating the peak heat flux on the shell (hot gas) side of boilers with a consequent reduction in hot gas erosion and tube-side fouling. Beyond design and method teachings appropriate to high temperature steam boilers, U.S. Pat. No. 5,653,282 claims:

19. The boiler of claim 12 [claim 12, in turn, traces to claim 11 giving specifics of the impingement bars], wherein the baffles have a disk and donut configuration wherein the support baffles comprise donuts.

No particulars regarding tube or row spacing are given; i.e. radial symmetry with an equal number of tubes in every tube row and the required spacing between tubes required for uniform or near uniform heat transfer to every tube; the preferable range of shell side flow conditions, such as Reynolds number. Instead, the disk and donut heat exchange configuration appears to have been selected because of its ease of integration with an encompassing cylindrical distributor plate having perforations spaced to cause the through gas flow impingement upon impact bars mitigating hot gas erosion of the heat exchange tubes. The addition of a perforated distributor plate and impact bars comprise a different heat exchange configuration from the present work and does not encourage the uniform shell-side flow which is an object of the present invention.

R. H. Tull, in U.S. Pat. No. 2,519,084, seeks a high specific heat transfer efficiency with a zig-zag tubing configuration wherein the tubes are alternatively sloped away from the shell centerline to completely pass through a donut shaped baffle plate having a central hole; followed by a radial convergence in order to completely pass through a circular baffle plate. The tubes are all finned and the shell-side flow, in order to get around the circular baffle plate must pass across all of the finned tubes. Then, after passing around the circular baffle plate, the flow must pass across all of the finned tubes again in order to pass through the central hole in the donut shaped baffle plate as in the present work.

The zig-zagging tubes according to U.S. Pat. No. 2,519,084 enable some economy in shell volume relative to the present work but at a considerable increase in difficulty of fabricability. In contrast, the coaxial tubes of the present invention are substantially straight and thus the apparatus is easier to assemble while still obtaining high efficiency. The inclusion of finned tubes will increase heat transfer per unit of tube surface area but at the expense of a diminished heat transfer surface area, i.e. the presence of the fins forces a more distant spacing of tubes. Also, it further increases the relative difficulty of assembly. In any event, the heat transfer configuration of U.S. Pat. No. 2,519,084 is significantly different from the present work and no particulars regarding the tube or row spacing are given; i.e. radial symmetry with an equal number of tubes in every tube row and the required spacing between tubes required for uniform or near uniform heat transfer to every tube; and the preferable range of shell side flow conditions, such as Reynolds number.

S. J. Jacoby, in U.S. Pat. No. 2,625,138, is concerned with the design of a water heater having a number of substantial differences from the invention. In U.S. Pat. No. 2,625,138 a principle object is the storage of hot water at a uniform or near uniform temperature i.e. at column 4, line 2 it is noted that:

. . . While such location [of sensing element SE] is by no means critical, it has been found highly advantageous as reflected in better heating efficiency and greater uniformity of water temperature throughout the tank.

One of the objects of the heat exchanger according to our invention is to exchange the maximum amount of heat possible consistent with the smallest, and least capital intensive, heat exchange module possible. In the interest of high thermal efficiency it is a further object to exchange this heat with a minimum required temperature difference, "delta T", between adjacent hot and cold streams. This enables a very high specific performance. That is, an 80 gallon water heater which can heat 80 gal of water from ambient to approximately 150° F. in 20 minutes supplies heat at a rate of 200,000 Btu/hr. The internal volume of the tank, not counting the flue duct volume is about 11 ft$^3$. A slightly larger regenerative heat exchanger, 15 ft$^3$, designed according to the present invention will heat 100 gallons of water per minute from ambient to 270° F. with a 95% efficiency and utilizing a counter-flow recycle water stream which enters the shell side of the exchanger at 280° F. and exits at only 80° F. The total heating rate in the case of regenerative exchanger is 10,000,000 Btu/hr or nearly 50 times greater. Finally, the baffle plates in U.S. Pat. No. 2,625,138 do not extend to the inner wall of the heater (e.g. compare text at column 3, lines 17–21 with text at column 3, lines 28–33); neither can they be extended to the wall. That is, in order to attain a uniformity of temperature within the hot water tank it is necessary that the water at the top of the tank which is cooling down have a natural convective as opposed to a forced convective circulation path to the bottom of the tank where it can mix with incoming water and contact the hottest wall or otherwise most heated portion of the flue gas duct(s). Since the rising hot fluid passes through the central hole in the "donut" configured baffle plates, the cooler descending water stream must pass between the wall and outer diameter of the baffle plate. This circulation path which is required for the device to perform according to the invention precludes baffle plates which extend out to the heater walls.

K. B. Ris' heat exchanger, in U.S. Pat. No. 1,798,354, has a first set of baffle plates that are cut radially thereby allowing the sectors of the baffle plate to be twisted to form fan-or propeller-like blades. The design of these plates effects, to some degree, a radially outward shell-side fluid flow by imparting a swirl momentum to the shell side fluid. This design feature is different from the present invention which achieves the same end with a solid central baffle plate. The present configurations disclosed are unique where each tube bundle features a radial symmetry where there is an equal number of tubes in each circumferential tube row.

Guetlhuber, in U.S. Pat. No. 3,760,870, incorporates a disk and donut heat exchange configuration into a device designed to extract heat at a non-constant rate from a nuclear reactor. The control device is an internal shunt which apportions a controllable fraction of the total coolant flow through the heat exchange core and causes the remaining fluid fraction to bypass the heat exchange process.

However, both the design and the application of the heat exchange device in U.S. Pat. No. 3,760,870 are different from the present invention. The exchanger in U.S. Pat. No. 3,760,870 features a central feed tube which traverses the length of the heat exchange core. No information is supplied concerning the desired spacing between tubes or between successive baffle plates; the geometry of the tube pattern; or the desirability or requirement that the device be operated in an all turbulent, that is, both tube- and shell-side fluid, flow regime. Typically, since the highest specific performance in terms of the total heat transferred per unit heat exchanger volume requires a large number of small diameter tubes, a large number of relatively close spaced baffle plates is required to ensure a turbulent shell-side flow. Finally there is no application for the operation of the device of U.S. Pat. No. 3,760,870 in a regenerative mode or for the purification of water. The central feed tube comprises a significant departure from the present invention, since because it is transporting a colder, or hotter, fluid it will equilibrate at a temperature different from the balance of the assembly and will therefore cause thermal stresses with an enhanced likelihood of causing future leak paths in the system.

Joklik et al., in U.S. Pat. No. 3,901,659, claim a disk and donut heat exchange configuration where the intent is to remove heat, as required, to maintain constant temperature in a tube bundle where the tubes are filled with catalyst to promote the partial oxidation of organic feed stocks. As such it is not a classic heat exchange configuration for the exchange of heat from one fluid stream to a second fluid stream. On this basis it more comparable to Jacoby U.S. Pat. No. 2,625,138, than the present work.

At column 4, lines 43–48, U.S. Pat. No. 3,901,659 specifies that the donut-shaped baffle plate must extend to the reactor wall as in the single tube bundle configuration of the present work, but he does not require either that the inner periphery of the donut-shaped baffle plate be such as to encompass all of the tubes between interior and exterior radii or that the disk shaped baffle plate also encompass all tubes, requiring only that:

. . . The disk-shaped baffle plates leave a free passage between their outer circumference and the inner circumference of jacket 11. (column 4, lines 46–48)

Neither does U.S. Pat. No. 3,901,659 disclose any of the design parameters such as tube pattern, baffle-plate spacing, required level of turbulence etc. required for high efficiency in a bona-fide, fluid-to-fluid heat exchange configuration. Joklik et al. patent a fused salt-cooled catalytic reactor, which differs both in intent and application from the present invention.

Cameron, in U.S. Pat. No. 5,277,247 patents a tube bundle configuration wherein the tubes are laid out in a pattern forming a series of pentagons. An object of the pentagonal tube layout is greater ease of fabricability and therefore lower cost. Such a layout, however, has the disadvantage of non-uniform heat transfer. Unlike the uniform heat transfer configuration sought in the present invention, the number of tubes in each pentagonal tube row increases with increasing radius to maintain a geometric symmetry. This configuration means that the shell side mass flow between tubes decreases with increasing radius and heat transfer is not uniform. This characteristic and the pentagonal tube pattern differentiate U.S. Pat. No. 5,277,247 from the heat exchange configurations disclosed herein.

Cameron, in U.S. Pat. No. 5,615,738 patens a number of valving configuration useful for regulating the extent of heat exchange between two fluid streams. The designs and methods taught all concern the valving of shell side fluid flow as a means of implementing temperature control are more or less specific to the catalytic oxidation of sulfur dioxide, $SO_2$.

The "disk and donut" patents cited above do not recommend any specification concerning the spacing of the baffle plates but, if an inference can be drawn from the accompanying illustrations, appear to disclose a baffle plate spacing approximately between 40% to approximately 80% of heat exchanger diameter.

In a conventional tube and shell heat exchanger there are three possible leakage paths which might be considered end-runs and hence are unproductive in effecting efficient heat exchange between tube- and shell-side fluids. First, some portion of the shell-side flow can slip through the small annular gap between each tube where it penetrates through a baffle plate. Some clearance gap is necessary for fabricability and this loss is also incurred with the disk and donut configuration of the present invention. Second, in a conventional tube and shell heat exchanger the shell-side fluid can also leak through the clearance gap between each baffle plate and the heat exchanger wall. This leakage mode is only half as much of problem with the disk and donut configuration of the present invention because it is possible only for the donut baffle plates, not for the intermediate "disk" plates. Finally, in a conventional tube-and-shell heat exchanger some portion of the shell-side flow can flow around the tube bundle between the outermost tubes and the heat exchanger wall, thereby bypassing the heat exchange process. This loss can be substantial in a conventional heat exchanger because the repeated fluid accelerations and decelerations of the shell-side have caused an appreciable pressure drop as the shell-side flow traverses through the tube bundle, which pressure drop also drives the bypass flow. Because of the radial flow this loss is entirely eliminated with the disk and donut configuration.

None of the heat exchangers described above are disclosed as part of a water treatment apparatus.

Various water treatment and sterilization systems are discussed below.

Karassik et al., in U.S. Pat. No. 3,212,566, claims a home water sterilization unit where the unfavorable economics of operating at a thermal efficiency of less than 90% ["X"+20° F. delta T] might be accepted for the convenience gained from the knowledge that both hot and cold streams were free or nearly free of living microorganisms. However, U.S. Pat. No. 3,212,566 does not include a catalytic bed or any other provision for either; a) oxidation or removal of organic contaminants or; b) a means for removal of the pyrogens or residual cloudiness left over from the microorganisms killed; or c) for removal and control of any inorganic contaminants present according to the present invention. In addition, the heat exchanger does not include the disk and donut configuration of the invention.

The provision for on-line hot water at 150° F. adds complexity and, without a relatively sophisticated control system, threatens system functionality. That is, the withdrawal of water at some intermediate temperature (150° F. in U.S. Pat. No. 3,212,566) renders the water withdrawn unavailable for heat exchange with the incoming cold water. This will upset the regenerative heat balance causing water to enter "holding chamber 32" at less than a microorganism killing temperature. Also for economy on an industrial or municipal scale a 95–98% efficiency [consistent with an "X"+ (no more that 8–10° F.)] is necessary unless the organic concentration is sufficiently high that the heat of oxidation can compensate for a lower heat exchange efficiency. This feature is not anticipated in U.S. Pat. No. 3,212,566. This patent discloses lower thermal efficiency than the present invention, and does not claim any particular heat exchange configuration or require any other process elements such as chlorination, oxygenation, ozonation, etc. to kill microorganisms and filtration, or molecular sieve, membrane elements desirable for removing other organic and inorganic contaminates.

Swift et al., U.S. Pat. No. 4,861,489 seeks to reduce biological infectivity from the unwanted but unavoidable small water droplets present in air exposed to, for example, circulating water in, for example:

fountains and artificial waterfalls, water cooling towers, air humidifiers.

This object is accomplished by on line electrolytic introduction of ions of silver, copper and/or zinc into the circulating water which ions, even at low concentrations, are particularly effective at killing microorganisms such as Legionella Pneumophila which might otherwise grow and multiply in the water circulation system. However, U.S. Pat. No. 4,861,489 is dissimilar from the present invention where the Legionella and other microorganisms are killed by time at a high temperature rather than by a toxin. Also Swift does not disclose any means of destroying organic contaminants and addresses the utility of his system to circulating recycled water systems and basically offers the substitution of silver, copper or zinc ions instead of chlorination or ozonation.

Ciepiela et al. in U.S. Pat. No. 4,676,908, address the clean-up of waste water from the steam-extraction of heavy oils. As an example he addresses clean-up of a 2000 GPM waste water stream. However, there are substantial differences from the present invention. U.S. Pat. No. 4,676,908 uses pulverized anthracite, e.g. coal, as a filtration media followed by an adsorption bed of activated carbon or charcoal to eliminate organic contaminants. The present invention employs catalytic oxidation which is also effective against microbiological pathogens. In U.S. Pat. No. 4,676,908 the activated carbon becomes saturated with adsorbed organic contaminants and must be replaced. The spent material is burned, at least in part, which effectively exchanges a water pollution concern for an air pollution problem. U.S. Pat. No. 4,676,908 teaches a hierarchy of process treatments for elimination of inorganic contaminants starting with electrodialysis, or reverse osmosis, followed by an ion exchange, or reverse osmosis, unit for polishing. The teaching is appropriate to a higher inorganic contaminant concentration than is typically encountered in municipal and other waste water streams where the organic and microbiological contaminants pose a greater health risk.

It would be advantageous to the industry if water is oxygenated and pumped under modest pressure, such as 35 psi or higher, through an efficient regenerative heat exchanger, where it is heated most of the way, about 95% or higher, up to a temperature of 280–300° F. and then passed through a suitable catalytic oxidization reactor. The expense of heating with such a heat exchanger is largely if not completely eliminated. Organic contaminants in the water are oxidized to relatively innocuous inorganic constituents, principally carbon dioxide and water; and a kill of all microbial, viral, fungal or protozoan microorganisms harmful to humans or fish is guaranteed by the high temperature attained within the apparatus of the present invention.

The regenerative heating of water is difficult. First, water has the highest specific heat of any common substance, which means that more heat has to be exchanged for the same regenerative efficiency than for any other substance. Secondly, the physical properties of water: low thermal conductivity; and relatively high viscosity; are not readily compatible with an efficient heat exchange configuration that is also amenable to processing large volumes of water at a low pressure drop. Further, the usual requirements for low cost materials and the need for appreciable thickness allowance for corrosion or scale buildup are also incompatible with the plate/fin heat exchange configurations which have become popular in air conditioning (HVAC) applications. Finally, unless the process of regenerative heat recovery is better than about 95% efficient, or the heat available from the catalytic combustion of organic contaminants present is sufficient to compensate for a lower efficiency, the energy cost of sustaining the 280–300° F. temperature required to assure destruction of all microorganisms potentially harmful to humans or animals and enable the catalytic combustion of the organic contaminants is too great to allow the proposed water treatment process to compete with other better known water processing alternatives.

Accordingly, in order to overcome these and other problems, the present invention relates to a unique radial flow shell and tube heat exchange configuration which, for the particular case of regenerative heating of water, is substantially more efficient than the standard shell and tube configurations because: (1) except for the tubes in the outermost tube row, the external (shell side) heat transfer coefficient to every tube is matched within 2–3 percent (as dependent upon manufacturing tolerances) to the external heat transfer to every other tube; and (2) the leakage flow past the baffle plates is greatly reduced with the new radial shell flow configuration proposed. In the absence of an outer row of rods or other turbulence promoting device, it is noted that, In the turbulent flow regime the external shell-side heat transfer coefficient for the tubes comprising the outermost tube row is approximately 80% or the external heat transfer-coefficient to the balance of the tubes. That is, the rate of heat transfer to, or from, the outermost tube row benefits from either stagnation point-wake-heat transfer but this benefit is not sufficient to compensate for the tubes having only two nearest neighbors instead of four.

In another embodiment of the invention, the heat exchange configuration is used with a novel bimetallic wet oxidation catalyst, which enables the elimination of organic contaminants and any pathogenic microorganisms harmful to humans, animals or fish. This embodiment is useful for processing a public or other potable water resource, for secondary and/or tertiary waste water treatment, for enabling a high density aquaculture, or for upgrading polluted ground water resources.

In yet another embodiment of the invention, the heat exchange and wet oxidation processes are used with suitable inorganic contaminant removal processes to completely purify a contaminated water stream or generate a potable water stream without addition of chemicals, chlorine or ozone which can lead to the production of potentially harmful chloramines and chlorinated hydrocarbons.

SUMMARY AND OBJECTS OF THE INVENTION

In achieving the above and other objectives, one embodiment of the invention is a radial flow heat exchanger comprising:

a) a shell;

b) a plurality of large circular baffle plates aligned coaxially within the shell and extending to an inner wall of the shell;

each of the large baffle plates defining at least one circular hole therein;

c) a plurality of small circular baffle plates aligned coaxially within the shell;

each of the small baffle plates alternately spaced from and coaxially positioned relative to each of the large circular baffle plates; and d) a plurality of symmetrically-arranged tubes positioned perpendicular to the small baffle plates and the large baffle plates forming at least one coaxial tube bundle extending through the plurality of small baffle plates and the plurality of large baffle plates;

wherein an inner radius of each of at least one coaxial tube bundle is larger than the radius of the at least one circular hole in the large baffle plate and the outer radius of at least one coaxial bundle is smaller than the radius of the small baffle plates; and wherein the small baffle plate defines at least one space outside the at least one tube bundle.

A second embodiment is a process for economically killing pathogenic microorganisms harmful to humans or animals in water comprising regeneratively heating pressurized water to a temperature of 280–300° F. or higher with a high efficiency heat exchanger.

A third embodiment is a process of economically purifying water comprising subjecting pressurized water from the heat exchanger defined above at a temperature of 280–300° F. or higher, oxidizing organic contaminants or pyrogens in the water subjected to the heat exchanger in a catalytic reactor at a temperature of 280° F. or higher, wherein the catalytic reactor has a wet oxidation catalyst and a means for supplying air or oxygen to the water.

A fourth embodiment is a water treatment apparatus comprising the radial flow heat exchanger.

DETAILED DESCRIPTION OF PREFERRED EMBODIMENTS OF THE INVENTION

Figure 4:
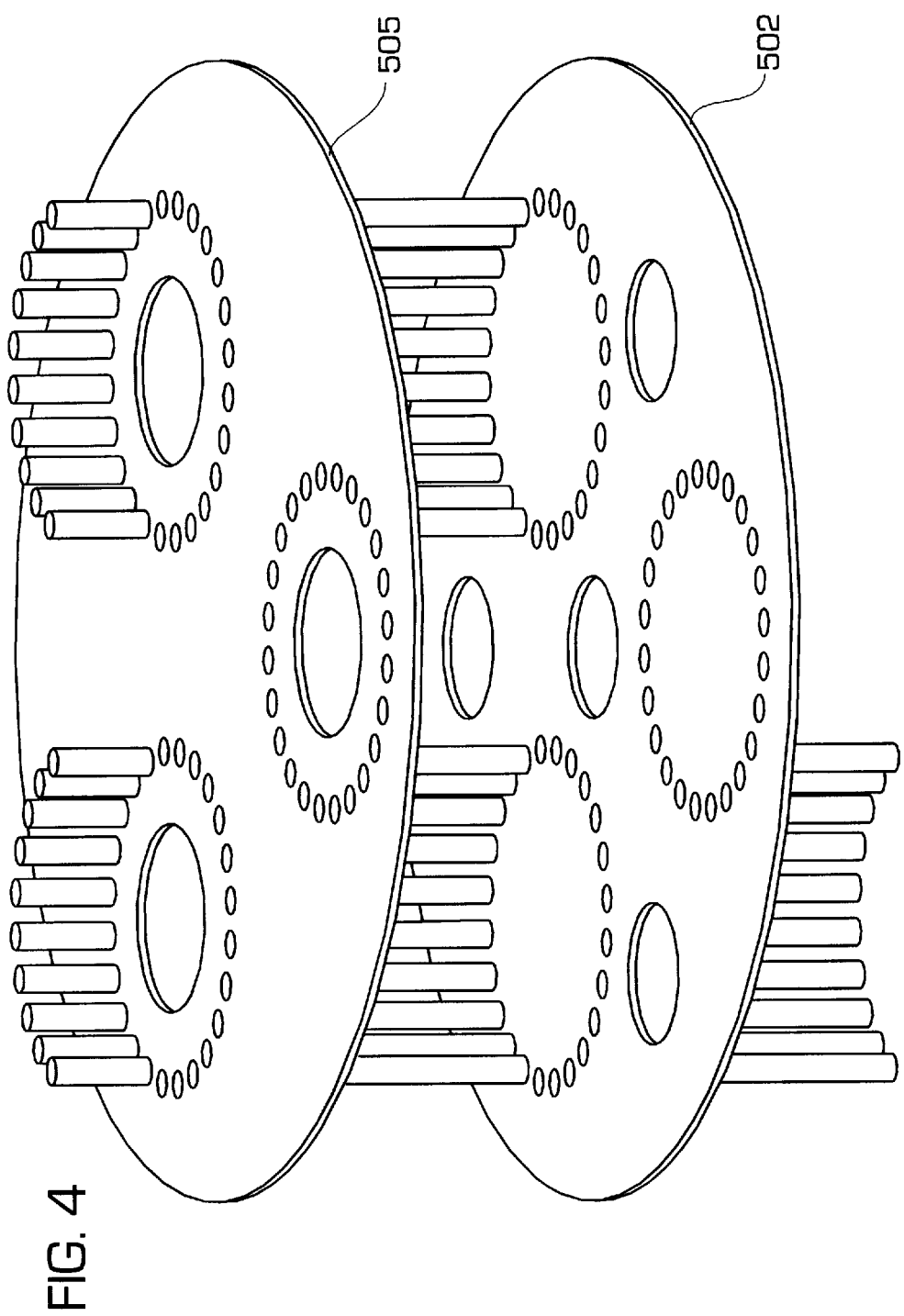
FIG. 4 is a schematic illustrating the layout for a configuration having three radial flow tube bundles.
Figure 5:
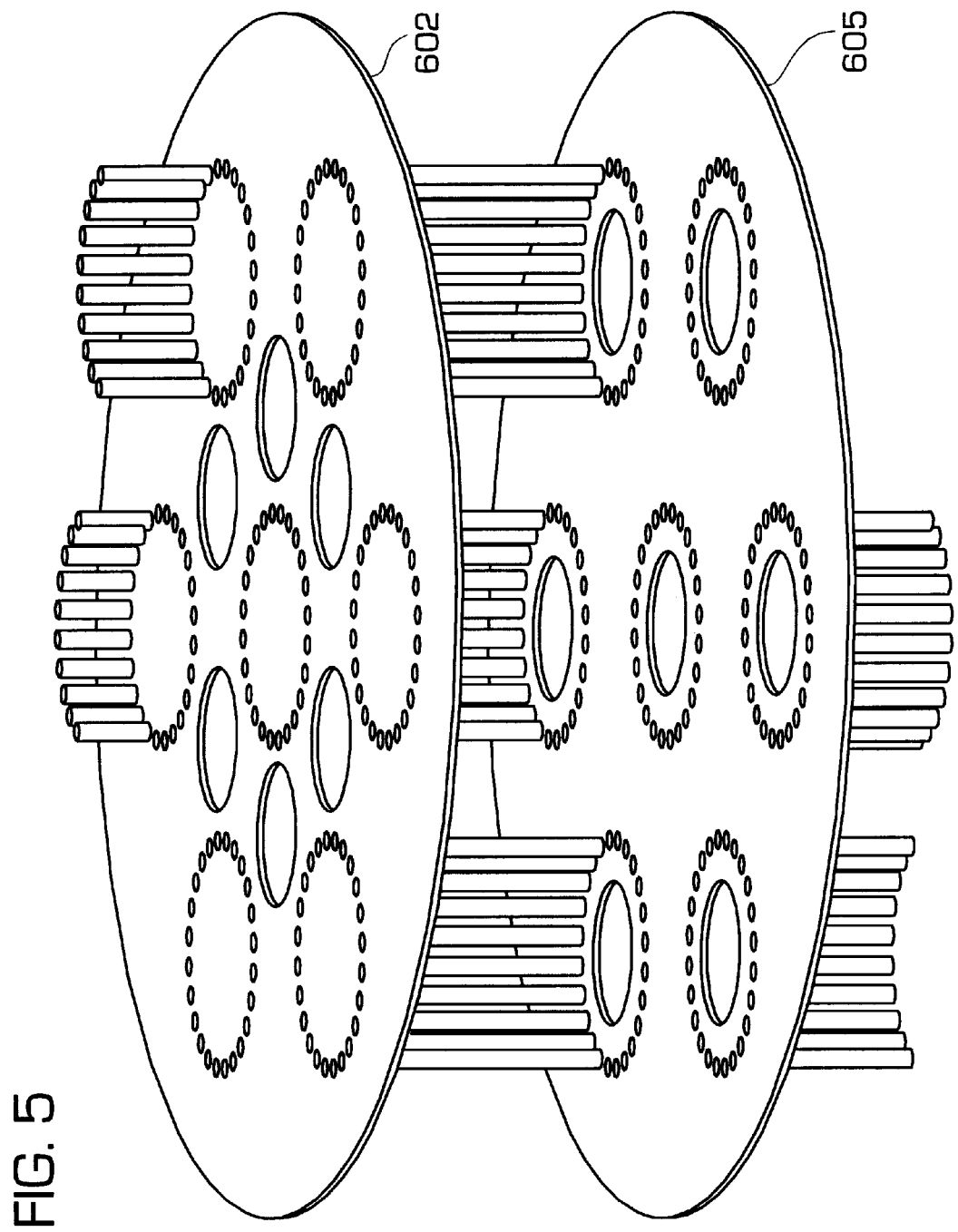
FIG. 5 is a schematic illustrating the layout of a configuration having seven radial flow tube bundles.

In accordance with the more detailed aspects of the present invention, the radial-flow heat exchanger of the present invention comprises a) a shell;

b) a plurality of large circular baffle plates aligned coaxially within the shell and extending to an inner wall of the shell; each of the large baffle plates defining at least one circular hole therein;

c) a plurality of small circular baffle plates aligned coaxially within the shell; each of the small baffle plates alternately spaced from and coaxially positioned relative to each of the large circular baffle plates; or as depicted in the schematics comprising FIGS. 4 and 5, including at least one hole external to the tube bundles in the configurations featuring more than one internal tube bundles and d) a plurality of symmetrically-arranged tubes positioned perpendicularly to the small baffle plates and the large baffle plates forming at least one coaxial tube bundle extending through the plurality of small baffle plates and the plurality of large baffle plates; wherein an inner radius of each of the at least one coaxial tube bundle is larger than a radius of the at least one circular hole in the large baffle plate and an outer radius of each of the at least one coaxial tube bundle, is smaller than a radius of the small baffle plates; wherein each of the small baffle plates defines at least one space outside the at least one tube bundle; and e) wherein the external heat transfer coefficient is the same or nearly the same for all of said tubes.

It is preferable that the at least one tube bundles comprise a number of tube rows as consistent with maximizing the surface area for heat exchange between hot and cold fluid streams; and that a uniform spacing, or gap, between tubes in each of the tube rows and its nearest neighbors on the adjacent tube rows be maintained. It is further preferable that the spacing or gap between tubes in the first row be less than twice the diagonal spacing distance between the nearest tubes on adjacent tubes rows.

The tube rows preferably have from 40–120 tubes/row, more preferably 60–100, and most preferably 90 tubes/row.

The heat exchanger preferably has 30 or more baffle plates, more preferably 100–300, and most preferably 120–250 baffle plates. The total number of baffle plates recommended herein is appropriate to a specific high efficiency heat exchange application and can be comprised in several smaller heat exchange elements connected in series.

In some circumstances it is advantageous to include a heating means for heating water to a temperature of 280–300° F.

In an even more preferable arrangement, each of the tube bundles has at least 6 tube rows; and more preferably 10–14 rows. The radial distance separating each of the tube rows decreases with increasing radius of each of the tube rows, such that the distance between each of the tubes and its nearest neighbors in the adjacent tube rows is essentially equal.

Preferably, the heat exchanger according to the invention has a smaller tube size and much closer spacing between baffle plates than previously-employed heat exchangers. In a "disk and donut" baffle plate configuration of the invention, much greater heat exchanger efficiency is possible with a greater number of smaller tubes and the "disk and donut" baffle plates spaced at less than 40% of the heat exchanger diameter. Preferably, the spacing is between 15 and 40% and most preferably from 20–30% of heat exchanger diameter.

The diameter of the heat exchanger varies with tube diameter. For example, a 10" diameter heat exchanger preferably has ⅛" diameter tubes; a 15" diameter heat exchanger preferably has 3/16" diameter tubes; and a 20" diameter heat exchanger preferably has ¼" diameter tubes.

To obtain the best heat efficiency, the spacing between baffles is 10–30 tube diameters; more preferably 12–20 tube diameters; and most preferably 16:1.

In this regard the disadvantage from a small cut, i.e. too close a baffle plate spacing, or a large cut is much less pronounced or even impossible with the "disk and donut" configuration of the present invention. Instead, since the flow velocity between tubes is inversely proportional to the spacing between baffle plates and the shell-side heat transfer coefficient increases rapidly with flow velocity between tubes, the separation between baffle plates can be decreased as required to produce a shell-side heat transfer coefficient comparable to the tube-side heat transfer coefficient and the shell-side flow will still correspond to an "ideal" flow pattern of previously employed heat exchangers that have baffle plate spacings that are about 40 to 80% of the heat exchanger diameter.

The need for a closer baffle plate spacing is also contrary to general engineering practice, where for tube sizes of 0.5 inches and larger the shell-side heat transfer coefficient is typically 2–3 times larger than the tube-side heat transfer coefficient. However, with the smaller tube sizes useful for the regenerative heating of water the tube side coefficient is inversely proportional to tube diameter—i.e., in turbulent flow:

$$h_{tube\text{-}side} = \frac{k_{water}}{D_{tube}} \cdot \left(\frac{D_{tube}U\rho}{\mu}\right)^{0.8} \cdot \sqrt[3]{Pr} \quad \text{Btu/hr·ft}^2 \cdot °F. \quad (1)$$

where $k_{water}$ is the thermal conductivity of the tube-side fluid; U is the mean flow velocity through the tubes; and $\rho$ and $\mu$ are the density and viscosity of the tube-side fluid, respectively. The fluid dynamic effects are correlated by the Reynolds number, $$\left(\frac{D_{tube}U\rho}{\mu}\right)$$

and the thermal properties of the fluid by the Prandtl number, Pr. As can be seen from Equation (1) the tube-side heat transfer coefficient is only slightly enhanced by reducing tube diameter, i.e. $h_{tube\text{-}side}$ is proportional to $D_{tube}$ to the −0.2 power. However, for equal tube-side flow area, the total tube surface area effective for heat transfer is proportional to $1/D_{tube}$. That is, for equal tube-side flow velocity, the required number of tubes is proportional to $1/D_{tube}^2$, so even though the surface area per tube is proportional to $D_{tube}$, the all important product, $h_{tube\text{-}side} A_{tube}$, which determines the rate of heat transfer per unit temperature difference is proportional to $1/D_{tube}^{1.2}$. In other words, if the tube diameter is halved four times as many tubes are required to pass the same amount of fluid at the same velocity, and overall tube-side heat transfer is enhanced by a factor of 2.3 If the tube diameter is reduced from ½ inch (common practice) to ⅛ inch, for example, overall tube-side heat transfer is enhanced by a factor of approximately 5.3. This means that some enhancement of the shell-side coefficient is necessary to "catch-up" with the improved tube-side heat transfer efficiency.

The heat transfer situation on the shell-side is somewhat more complex. The local shell-side coefficient varies around the periphery of each tube according to angle from stagnation, local fluid velocity, turbulence level and the relative proximity of any adjacent tubes. The local heat transfer coefficient is highest at the "pinch points" of minimum flow cross section between tubes; next highest at a stagnation point, and somewhat lower in the region between pinch points or in a wake region. Since all of the interior tubes are equidistant from four nearest neighbors, the mean shell-side heat transfer coefficients are equal to one another within approximation 2%. The fact that the "pinch points" are not spaced exactly 90° apart form one another is not of great consequence as long as the separation between nearest neighboring tubes is equal. The pinch points are spaced sufficiently far apart that there is negligible overlap of the regions of greatest heat transfer and the total heat transfer is essentially the sum of the heat transfer contribution from the four individual "pinch points." However, the tubes in the first and last tube rows have only two nearest neighbors in adjacent tube rows. This makes it difficult to achieve the same high shell-side heat transfer coefficient as that for the tubes in the interior tube rows.

One means of achieving equal shell-side heat transfer is to continue the tube pattern with innermost and outermost "tube rows" comprised of rods instead of tubes. This expedient ensures equal tube-side and shell-side heat transfer coefficients to all tubes regardless of position; but at the additional fabrication expense associated with inclusion of two extra "tube rows" comprised of rods having the same diameter as the tubes on the interior tube rows. However, for the innermost tube row the same high heat transfer coefficient can be achieved if the spacing between first row tubes is made equal, or comparable, to the main diagonal spacing between nearest neighbors on alternate tube rows. Then, each tube on the first row will also have four nearest neighbors and its shell-side heat transfer coefficient will be comparable to that of the tubes on the interior tube rows. This leaves only the outermost tube row. Here again an exterior "tube rows" comprised of rods would fulfil the principle of four equidistant nearest neighbors, which we have found is sufficient to ensure equal heat transfer in the turbulent flow regime. However, in most cases an outer tube row having a 20–25% lower heat transfer coefficient is better than no effectiveness at all, i.e., when tubes on the outermost tube row are replaced with rods, However choosing between:

a radial tube pattern with all tubes wherein an equal diagonal separation between nearest neighboring tubes on adjacent tube rows is maintained for all tubes;

a radial tube pattern wherein an equal diagonal separation between nearest neighboring tubes on adjacent tube rows is maintained for all tubes and the innermost, outermost, or both "tube rows" are comprised of rods having outside diameter and tube to rod separation distance equal to the diameter and separation distance between interior tube rows;

a radial tube a pattern wherein an equal diagonal separation between nearest neighboring tubes on adjacent tube rows is maintained for all tubes and the tube-to-tube separation between tubes on the first row is equal to, or comparable to, the diagonal separation between nearest neighboring tubes on adjacent tube rows; or a radial tube pattern wherein an equal diagonal separation between nearest neighboring tubes on adjacent tube rows is maintained for all tubes and the tube-to-tube separation between tubes on the first row is equal to, or comparable to, the diagonal separation between nearest neighboring tubes on adjacent tube rows and the outermost "tube rows" is comprised of rods of equal diameter instead of tubes;

may involve numerous other factors in addition to cost, and for the purposes of this disclosure all of the variations involve similar considerations which have been disclosed in the foregoing paragraphs.

The length of the heat exchanger required for efficient regenerative heating of water is preferably 20 to 40 feet for a ⅛ inch tube size and water flow rate of 80 to gallons per minute. The required length generally increases with hole size and flow rate. For a ¼ inch tube size and a water flow of 500 to 1500 gallons per minute, a length of 40 to 80 feet is more preferable. These lengths can be comprised of several shorter heat exchange elements connected in series assy for example, 4 to 8 10-foot lengths.

The heat exchanger can be operated as a co- or counter-flow mode or to exchange heat with another fluid. The heat exchanger can also be operated as a regenerative heat exchanger when the heat from the heated stream of fluid is used to preheat the incoming stream of fluid.

In another embodiment of the invention, a method of economically killing pathogenic microorganisms harmful to humans or animals in water comprises subjecting pressurized water to the heat exchanger of the invention at a temperature sufficient to kill the microorganisms. A minimum temperature of 280° F. or higher as required to kill microorganisms harmful to humans, animals or fish. Alternatively this temperature could be less than 280° F. if the time of exposure is increased.

In addition, this process can also be used to purify water economically by subjecting pressurized water containing organic contaminants or pyrogens to the heat exchanger of the invention at a temperature sufficient to kill the pyrogens of 280° F. or higher, and then oxidizing the organic contaminants or pyrogens in the water that was subjected to the heat exchanger in a catalytic reactor at this temperature, wherein the catalytic reactor has a wet oxidation catalyst and a means for supplying air or oxygen to the water. The velocity of the catalytic oxidation reaction continues to increase with temperature and the killing of microorganisms is more certain.

It is preferable that air or oxygen be supplied at a pressure sufficient to cause its injection into the water stream (which typically might be in the range of 30–100 psi). Once the air or water has been injected its pressure is the same as that of the surrounding water and pressure has much less of an effect on the rate of the wet oxidation reaction than temperature.

In order to minimize energy costs, it is most preferable to utilize heat generated from the wet oxidation of organic contaminants to sustain temperatures at or above 280° F. If such heat is not utilized, however, the energy cost per gallon required to effect a 10° F. temperature rise (e.g. from 270° F. to 280° F.) is approximately equal to the cost of chemical treatment such as chlorination, bromination, or ozonation, depending on local energy costs and the cost of compliance with governmental agencies.

If the concentration of organic contaminants is too low to sustain the desired operating temperature, typically 280° F. or higher, it is beneficial to heat the water with a heating means before the oxidizing step since the rate of the wet oxidation reaction increases rapidly with increasing temperature.

In yet another embodiment of the invention, a water treatment apparatus is provided that comprises the radial flow heat exchanger.

Preferably, the water treatment apparatus includes a catalytic reactor positioned in sequence with the heat exchanger, wherein the catalytic reactor includes a wet oxidation catalyst and includes a means for supplying air or oxygen to the hot water flowing through the catalyst bed.

Wet oxidation catalysts used in the water treatment apparatus of the invention are preferably binary precious metal alloys such as a platinum and ruthenium alloy.

The water treatment apparatus preferably includes a heating means positioned between the heat exchanger and the catalytic reactor.

The above embodiments are further described below with respect to the figures.

Figure 1:
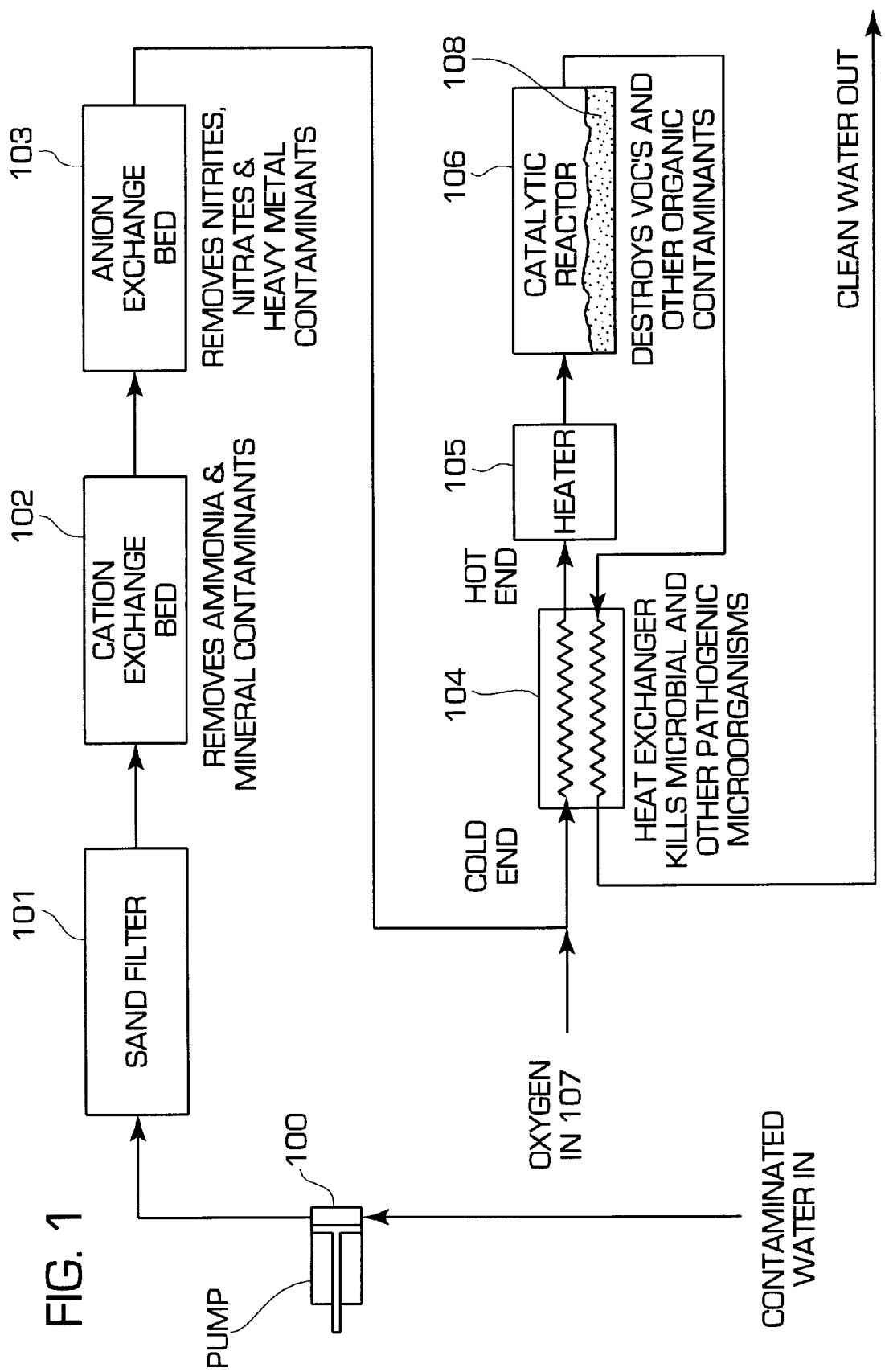
FIG. 1 is a schematic diagram of a water purification system.

FIG. 1 comprises a block diagram of the essential elements of a water purification system based upon the invention disclosed herein. In a typical configuration a pump 100, pumps polluted or otherwise contaminated water through, in succession: a filter 101; a cation exchange bed 102; and an anion exchange bed 103. Other alternative processes effective for water clarification and demineralization include filtration plus lime softening and the addition of various chemical coagulants or oxidizing agents. Before attacking the organic contaminants and microorganisms in the water it is preferable that the water be clarified and inorganic hardness of the water be appropriately reduced.

The invention is concerned with heating the water under pressure to a temperature of 280° F. or higher using a high efficiency regenerative heat exchanger, 104; adding make-up heat as required to maintain a temperature consistent with high catalytic activity in heater, 105; and destroying organic contaminants in a catalytic wet oxidation reactor, 106. The temperature kills any pathogenic microorganisms potentially harmful to humans, animals or fish and accelerates the rate of the wet catalytic reaction. The wet oxidation process also requires a source of oxygen or compressed air 107, which must be delivered at some pressure at or above the water pressure. Typically the water pressure will range from about 35 psig (the pressure corresponding to a water boiling point of 280° F.) to 100 psig or higher as required to effect complete oxidation of the organic contaminants and pyrogens left over after the microorganisms initially present in the water stream being treated have been killed. Preferably, so as to not hinder the velocity of the wet oxidation reaction, the air or oxygen flow should be at least two (2) times the stoichiometric requirement, and it can be introduced directly into the wet oxidation reactor as shown in the FIG. 1 or it can be introduced into the untreated water upstream of the regenerative heat exchanger.

According to the present invention, the heat required to raise the water temperature 95% or more of the way from an ambient temperature of 60–70° F. up to 280–300° F. comes from the water returning from the catalytic reactor, which, in the process, is cooled down to within 5–10° F. of the 60–70° F. inlet water temperature i.e. to 65–80° F. Some heat, typically 2–5% of the total heat required, must be added to the incoming stream before the water returns to the countercurrent side of the regenerative heat exchanger in order to keep the process going. This heat must be added before the water is returned to the counterflow side of the heat exchanger. Heat can be added before the water enters the catalytic reactor, or it can be generated in the catalytic reactor from the heat released by the wet catalytic oxidation of organic contaminants. However, with a regenerative heat exchange efficiency of 96–98% it is significant that the process energy cost becomes affordable and if the water being processed contains a 300–400 ppm or more of an organic contaminant all of the necessary heat can be recovered from the catalytic oxidation of the organic contaminant and no external source of heating is required.

For thermal sterilization of water to compete with chemical sterilization, the amount of heat required to sustain the desired processing temperature must not exceed 80–100 Btu/gallon (10–12 Btu/lb). In the case of counter-flow heat exchange between hot and cold streams of water, this requirement is the same as requiring that the temperature difference between incoming and returning water streams, after any self heating from the catalytic wet oxidation reaction, be no greater than 10–12° F. Or if the temperature required to ensure destruction of all microorganisms harmful to humans or other animals is 280–300° F.; and the temperature of the cold water inlet to the process is only 50–70° F., the inlet water must be preheated up to 270–290° F. by counter-flow heat exchange with the hot water returning from thermal processing while the returning hot water stream is cooled to 60–70° F.

Still in FIG. 1, after transit through heat exchange element 104, the incoming water stream may flow through, and receive heat from a heating element 105, which may or may not be integral with a wet catalytic reactor, 106, where a suitable wet oxidation catalyst 108, causes the oxidation of any organic contaminants present to inorganic products of reaction, predominantly water and carbon dioxide. Depending upon the chemical composition of the organic contaminants present the effluent from the catalytic wet oxidation reactor may also contain nitrogen, sulfur or halogen species present as elemental nitrogen, sulfate or chloride, bromide, etc. These inorganic compounds are typically easily disposed of and relatively innocuous or even beneficial to animal and plant life. However, as noted earlier, the economics of this approach depends heavily upon the efficiency of the regenerative heat exchange process, and is generally uneconomic if the heat from the topping heater element 105, is required to heat the water more than approximately 10° F. i.e. from 270 to 280° F., for example.

Figure 2:
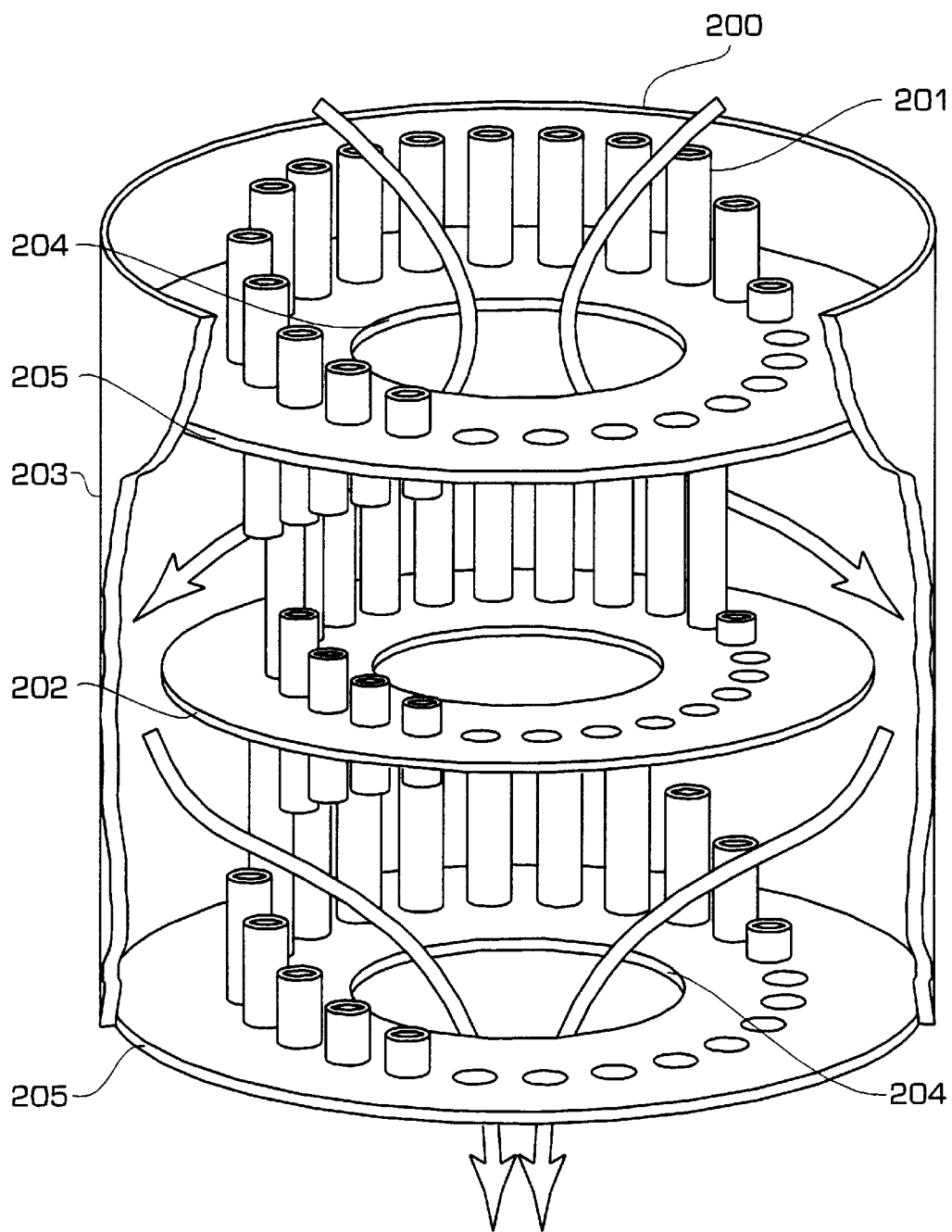
FIG. 2 is a schematic illustrating the high efficiency radial flow regenerative heat exchange configuration of the present invention with a single tube row.

FIG. 2 is a simplified schematic of a novel high efficiency radial flow regenerative heat exchange configuration 200 with only one tube row instead of a plurality of tube rows more in accord with recommended practice. The incoming, tube-side fluid is confined within a plurality of as many as several thousand tubes 201, while the returning, shell-side fluid is confined to flow on the exterior side of tubes 201. This segregation of fluids is common to all shell and tube heat exchange configurations and is well known in the industry. However, there are a number of distinguishing features in the layout of the tubes, or tube pattern, and in the geometry of the shell side flow which are preferable in a number of heat exchange applications where the thermal properties and mass flow of the tube and shell-side fluid are comparable and in particular, for the regenerative heating of water. In the regenerative heating of water, the heat exchanger of the present invention enables operating at high flow rates at thermal efficiencies of 95–98% or even higher.

The principle difference between the known art and the radial flow configuration which is a subject of this invention has to do with the radial symmetry of the shell-side fluid flow where the shell-side flow alternately goes around a small baffle plate 202, which is central to an external shell 203, encompassing the heat exchange core; then the shell-side fluid flows radially inward, across all of the tubes to pass through a central hole 204 in a large baffle plate 205; then radially outward across all of the tubes to pass around another small baffle plate 202, and so on. As shown in the figure, the small baffle plate 202, still extends past the outer radius of the outermost tube row of the tube bundle; while the radius of the central hole in the large baffle plate 205, is smaller than the inner radius of the innermost row of the tube bundle. This in order to pass from one end of the heat exchanger to the other end the shell-side fluid is forced to flow radially across all of the tubes between every adjacent pair of baffle plates: either radially outward past all of the tubes to get around a small baffle plate; or radially inward past all of the tubes to get through the central hole in a large baffle plate. This geometry enables equal and uniform contact between the shell-side fluid and every individual tube, and does not allow any of the shell-side fluid flow to bypass flowing past the tube rows.

Figure 3A:
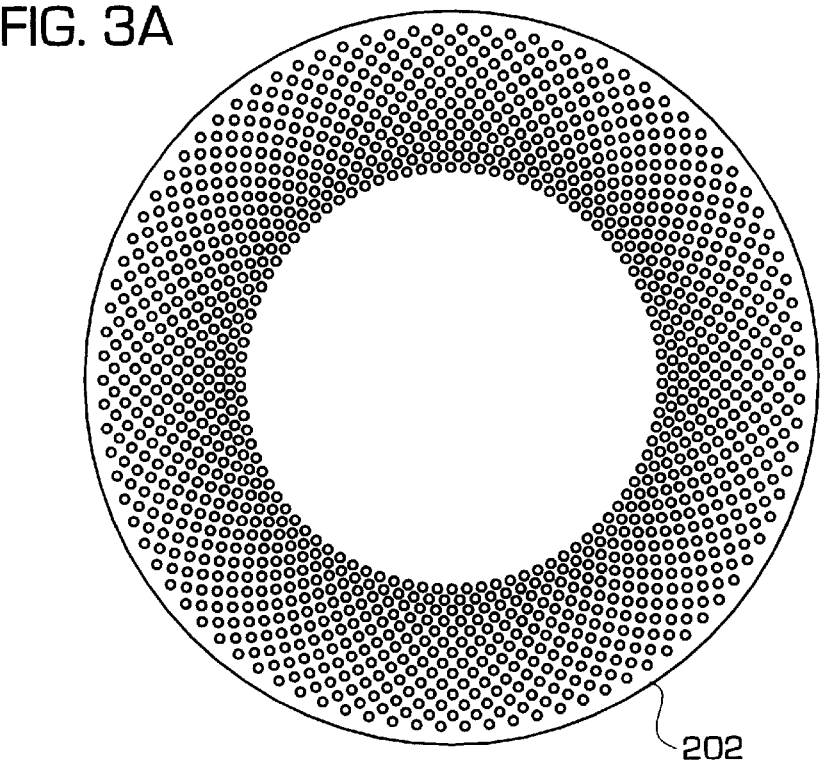
FIGS. 3A and B show a planar view of the small and large baffle plates shown in the schematic of FIG. 2, for an embodiment of the invention having 14 rows with 90 tubes per row.
Figure 3B:
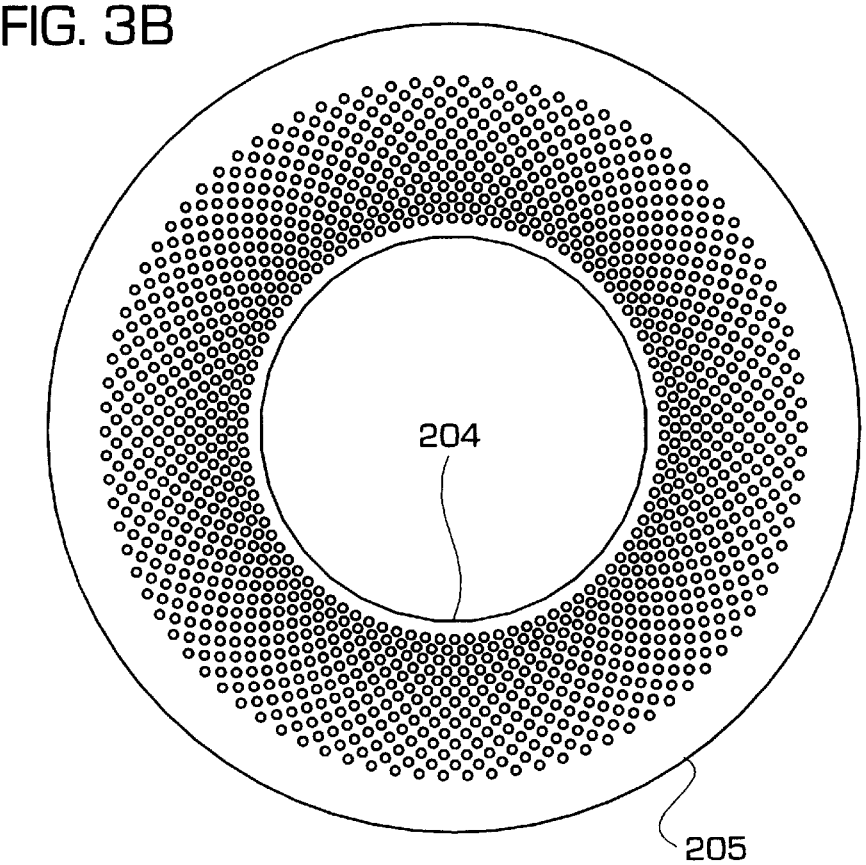
FIG. 3C is a planar view of a portion of a baffle plate, for an embodiment of the invention having 14 rows with 90 tube per row.
Figure 3C:
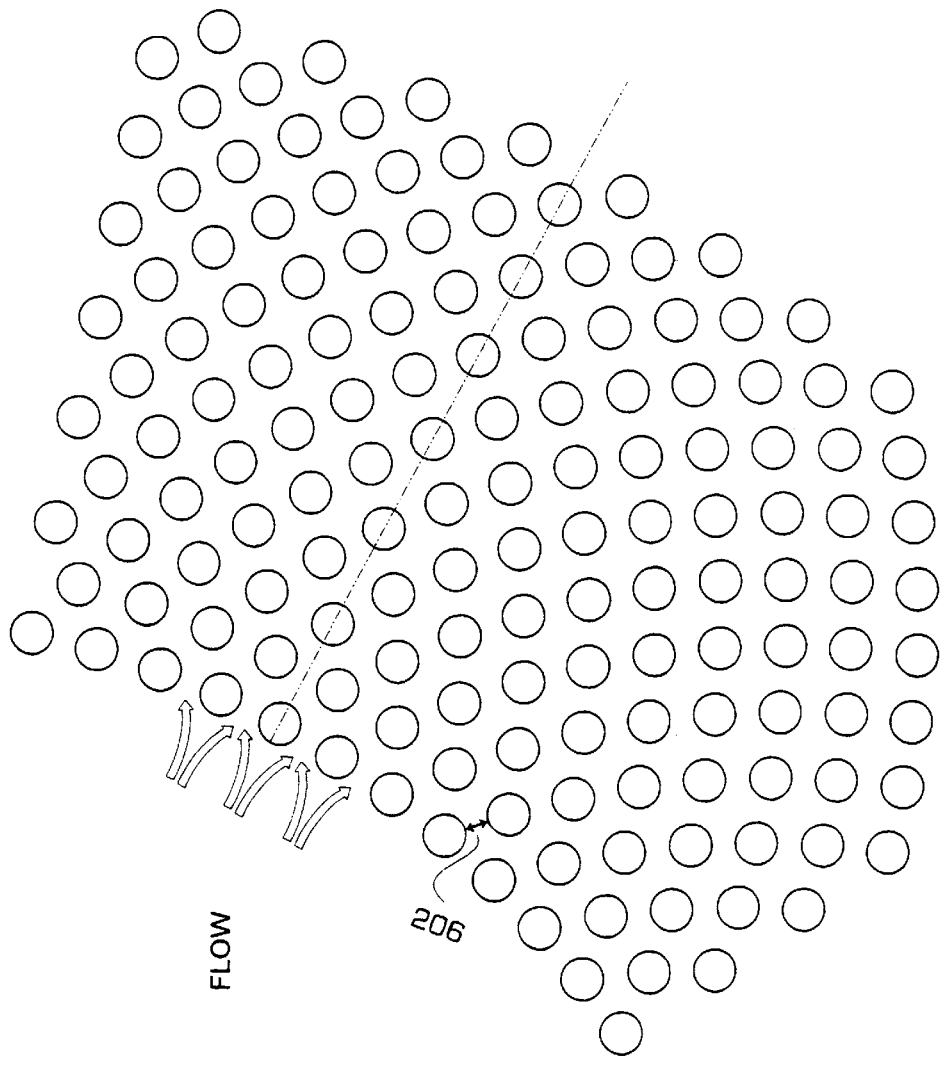

Looking now at a planar view of baffle plates 202 and 205 for a 14 row radial-flow tube pattern in FIG. 3, it can be seen that all of the tubes are laid out on concentric circular rows. In FIGS. 3A–3C the plates accommodate fourteen (14) concentric circular rows with 90 tubes in each row for a total of 1260 tubes. A second distinguishing feature is the radial distance separating each tube row from the adjacent tube rows which diminishes with increasing radius of the tube row; such that the diagonal distance 206, between any tube and its nearest neighbors on the next inner and next outer radii is the same for all tubes can also be seen in the figure. This ensures a high efficiency of heat transfer from the shell side fluid to the tubes which is equal, or very nearly equal for all tubes except for the outermost tube row where the stagnation point, or wake, heat transfer coefficient is generally insufficient to compensate for the fact that the tubes in the outermost tube row have only two nearest neighbors instead of four. Thus, depending on flow, Reynolds number, the shell-side heat transfer coefficient for the tubes in the outer tube row may amount to only 80% of the shell-side heat transfer coefficient of the interior tubes. In this regard it can be seen from FIG. 3 that the separation between tubes of the first row can be reduced from twice the diagonal gap between tubes as required to produce a shell-side heat transfer coefficient which is equal to the heat transfer coefficient of the tubes in interior tube rows.

One who is practiced in the art will recognize that the flow across the tubes corresponds to a triangular tube pattern which is known to be efficient in planar arrays, and that very little efficiency, if any, is sacrificed if the diagonal gap between tubes is not exactly equal, particularly for the innermost and outermost rows where some deviation from the maintenance of an exactly equal diagonal spacing between tubes may be expedient at substantially different flow conditions to enhance heat transfer to the innermost and outermost tubes which are in closest proximity to only two diagonal neighbors instead of four as is the case for all the tubes in the central tube rows. Similarly one practiced in the art will recognize that a tube pattern where the tubes are radially in-line with one another does not defeat the inherent efficiency of the radial flow geometry. In this regard the radial flow geometry is unique since it does not allow any part of the shell side flow to bypass flowing between the tube rows. This is not the case with conventional shell and tube configurations, where an appreciable fraction of the shell side flow can pass between the outer shell or housing and the peripheral tubes as noted above; and therefore is a source of diminished efficiency as far as promoting effective heat exchange between fluids in conventional heat exchange configurations.

In FIG. 3, the circumferential pitch between tubes in the first innermost tube row is the same as the diagonal pitch between the nearest neighboring tubes on the second tube row. Two tubes in the first row and their nearest common neighbor in the second row create an equilateral triangle. However, the equilateral triangle is possible between tubes of the first and second rows. The circumferential pitch is greater than the diagonal pitch for the tubes in the second row, and still greater for tubes in the third row, etc. Eventually at about the seventh row the circumferential gap between tubes is approximately twice the diagonal gap between the nearest neighboring tubes on the sixth and eighth tube rows, i.e. as required by Cameron in U.S. Pat. No. 4,357,991 for his first tube row. This is significant because the double gap width required by Cameron, does not apply to the first six interior tube rows in FIG. 3. This means that to accommodate Cameron fewer tubes could fit within the same heat exchanger shell and overall performance would be proportionately decreased.

FIGS. 4 and 5 depict the geometry for an ensemble of 3 and 7 radial flow tube bundles respectively, where each tube bundle might contain a thousand or more tubes, for example corresponding to the tube pattern shown in FIG. 3 for a tube bundle of 1260 tubes. In FIG. 4 the tube-side fluid flows through three such bundles in parallel, and in FIG. 5 the tube side fluid flows through seven such bundles in parallel. In both figures it can be seen that all of the baffle plates must extend to the outer wall of the heat exchanger, but that the baffle plates corresponding to the small baffle plate 202, in FIG. 2, features at least one large hole or passageway external to the individual tube bundles, whereas the baffle plates corresponding to the large baffle plate 205, in FIG. 2, features a single large hole or through passageway in the center of each tube bundle. Thus, when baffle plates 502 and 505 are alternated the flow leaving the large holes central to the individual tube bundles in baffle plate 505 is still forced to flow radially out past all of the tube rows to reach the holes or through passageways in plates 502; and then must flow radially inward across all of the tubes in order to pass through the centrally located holes in plate 505. A similar configuration will be apparent with respect to plates 602 and 605 in the seven tube bundle configuration of FIG. 5. Frictional effects tend to equalize the flow between individual tube rows and between different tube bundles in FIGS. 4 and 5, and because fluid friction is substantially greater for the flow between tubes than it is for flow through the large holes external to the tube bundles in plates 502 and 602; the location of the holes in plate 502 and 602 is of relatively little import so long as the holes are sufficiently large that pressure-drop losses are minimized.

Another feature of this invention is the choice of binary precious metal alloys such as platinum and ruthenium combined in a molar ratio of approximately 1:1 for the wet oxidation catalyst. Approximately 2:1 on a weight basis. In this case the presence of ruthenium greatly enhances catalytic activity for the oxidation of ammonia or the amino ($—NH_2$) grouping and the sulphide or mercaptan (—SH) groups, thereby imparting increased resistance to deactivation or poisoning in the presence of these organic groups while not affecting or even modestly increasing activity relative to a pure platinum catalyst for the oxidation of hydrocarbons and carbohydrates.

Figure 6:
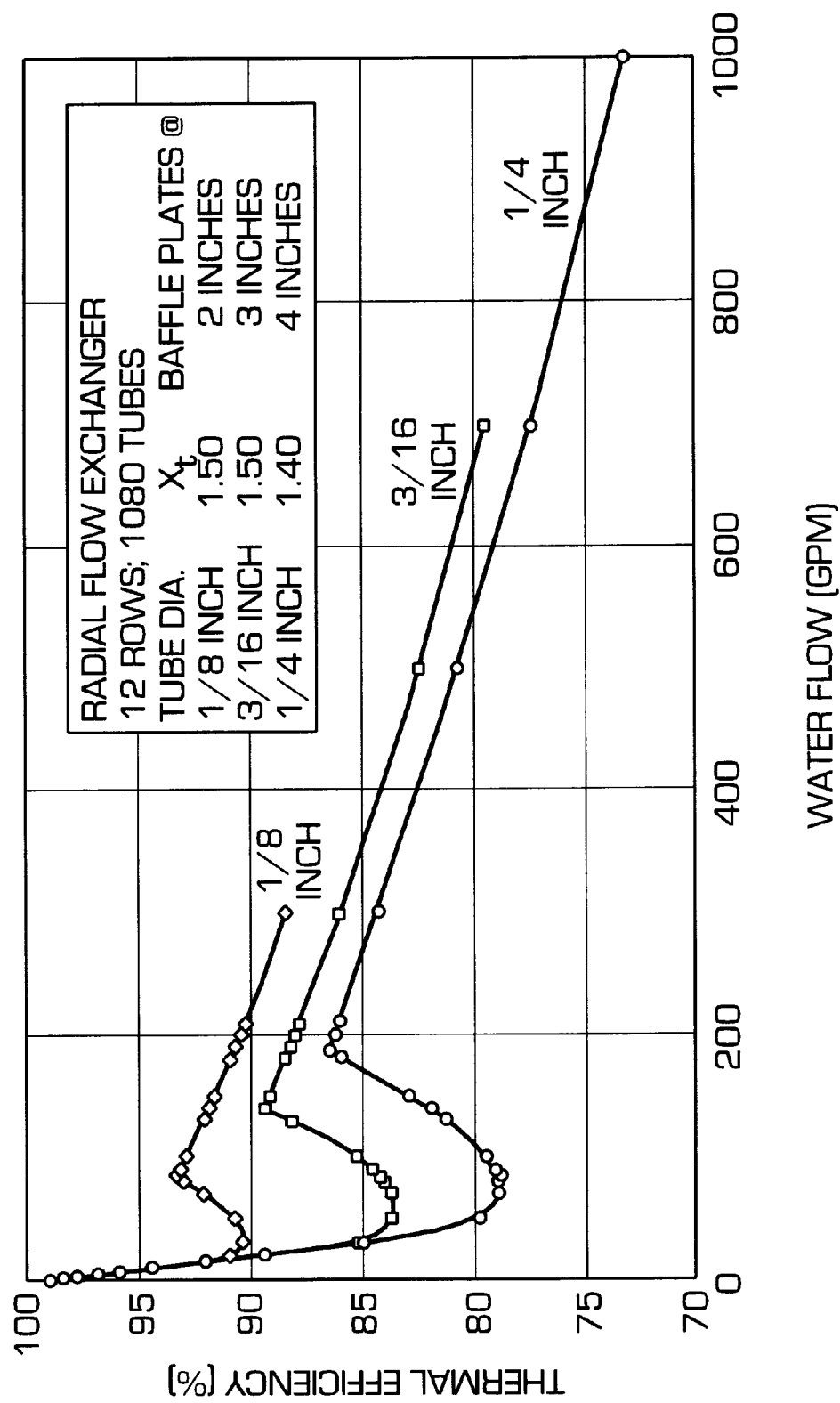
FIG. 6 is a graph of the thermal efficiency (%) vs. water flow (gpm) of a 20 foot exchanger comprised of a single tube bundle for the regenerative heating of water.
Figure 7:
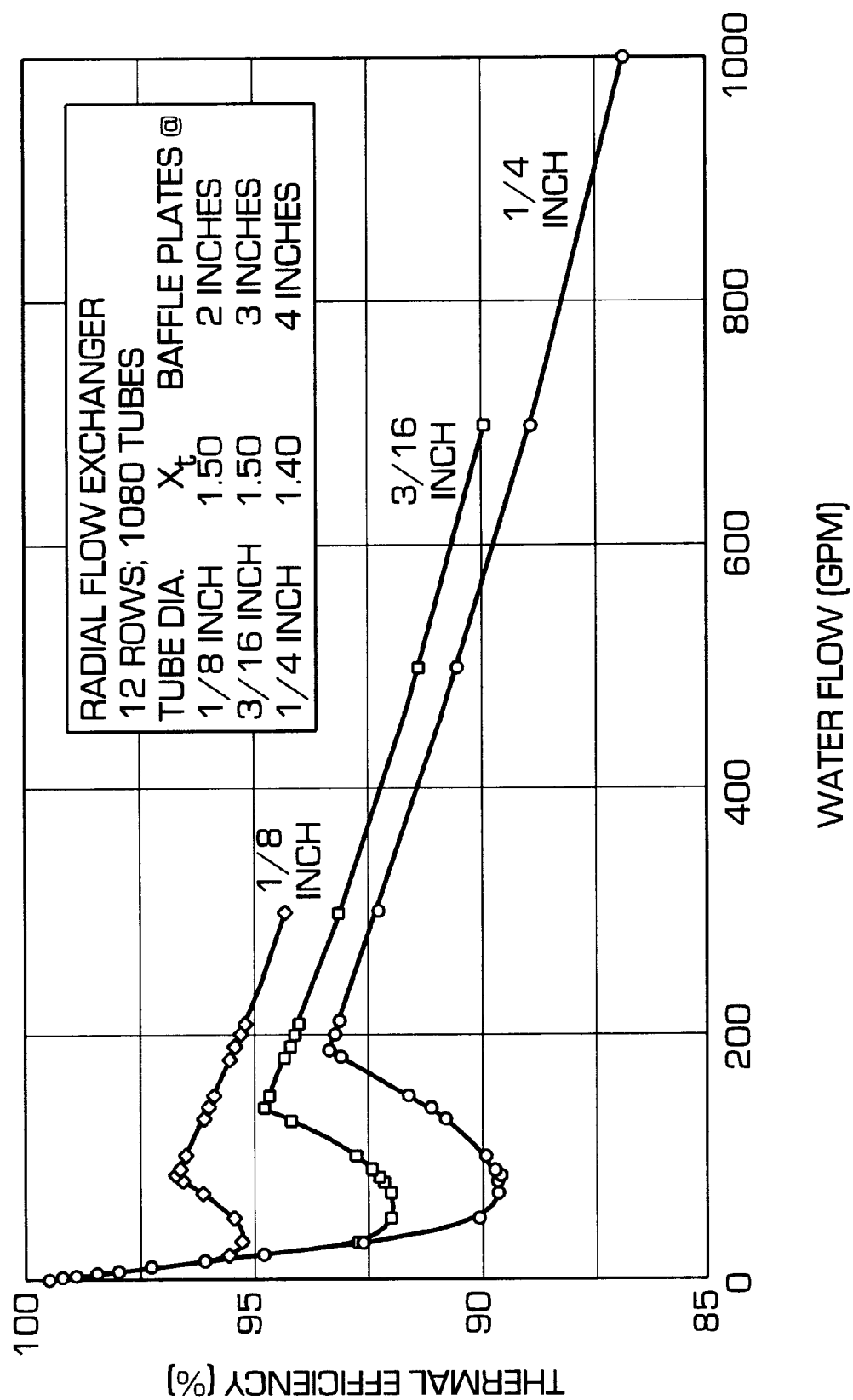
FIG. 7 is a graph of the thermal efficiency (%) vs. water flow (gpm) of a 40 foot exchanger, or two 20 foot exchangers in series, for the regenerative heating of water.

FIG. 6 is a graph of Thermal Efficiency vs. Water Flow which is based on the values in Table 1 for a 20 ft. heat exchanger with 1080 tubes. The uppermost curve is for 1080 ⅛" tubes. Such a heat exchanger is 10 inches in diameter and weighs about 1200 lbs. if fabricated from stainless steel or a higher (more corrosive-resistant) alloy. The tube pattern is the same as that exhibited in FIG. 3 except that the projected performance is for a device of 12 radial rows of 90 tubes each instead of 14 rows as shown in FIG. 3. The curve in the center of the graph is for 1080 ³⁄₁₆" tubes; and the lowest curve is for 1080 ¼" tubes. It is worthy of note that the shape of the performance curve for a 40 ft heat exchanger (or two 20 ft heat exchangers in series) in Table 2 and in FIG. 7 is nearly identical to FIG. 6, which is based on the values in Table 1 for the performance of a 20 ft. long heat exchanger except that for a 20 ft. long exchanger the ordinate ranges between 70% and 100% thermal efficiency; whereas in Table 2 and in FIG. 7 for a 40 ft. long exchanger the efficiency ranges from 85–100%. In other words, at similar flows conditions, the inefficiency scales as the inverse of length. For equal flow and an equal number of tubes on the same tube pattern, doubling the heat exchange length halves the inefficiency.

FIG. 6 and 7 illustrate the benefit from operating in a Turbulent Flow Regime. The tube spacing required for equal heat transfer to every individual tube is a crucial requirement for high efficiency and hence process economy. As can be seen from FIGS. 6 and 7, at low flow rates of less than 20 to 50 gallons per minute, where the flow is laminar, thermal efficiency drops off rapidly with increasing throughput. However with a further increase in throughput the flow transitions to turbulent and thermal efficiency starts to recover. That is, with turbulent flow the heat exchanger can handle 7–10 times more water flow with equal high efficiency as it can when the flow is entirely laminar.

TABLE 1

Efficiency of Regenerative Radial Flow Heat Exchange Configurations

| | Overall Efficiency of 20 ft Length | | | Overall Pressure Drop, (psi) | | |
|---|---|---|---|---|---|---|
| Regenerative Flow Rate (GPM) | 1080 tubes 0.125" OD 0.080" ID $x_t = 1.50$ Baffles @ 2" | 1080 tubes 0.188" OD 0.138" ID $x_t = 1.50$ Baffles @ 3" | 1080 tubes 0.250" OD 0.180" ID $x_t = 1.40$ Baffles @ 4" | 1080 tubes 0.125" OD 0.080" ID $x_t = 1.50$ Baffles @ 2" | 1080 tubes 0.188" OD 0.138" ID $x_t = 1.50$ Baffles @ 3" | 1080 tubes 0.250" OD 0.180" ID $x_t = 1.40$ Baffles @ 4" |
| 1. | 99.10 | 98.94 | 96.96 | 0.058 | 0.007 | 0.002 |
| 2. | 98.55 | 98.38 | 98.40 | 0.118 | 0.014 | 0.005 |
| 3. | 98.04 | 97.84 | 97.87 | 0.181 | 0.021 | 0.007 |
| 5. | 97.03 | 96.82 | 96.36 | 0.313 | 0.036 | 0.013 |

TABLE 1-continued

Efficiency of Regenerative Radial Flow Heat Exchange Configurations

| | Overall Efficiency of 20 ft Length | | | Overall Pressure Drop, (psi) | | |
|---|---|---|---|---|---|---|
| Regenerative Flow Rate (GPM) | 1080 tubes 0.125" OD 0.080" ID $x_t = 1.50$ Baffles @ 2" | 1080 tubes 0.188" OD 0.138" ID $x_t = 1.50$ Baffles @ 3" | 1080 tubes 0.250" OD 0.180" ID $x_t = 1.40$ Baffles @ 4" | 1080 tubes 0.125" OD 0.080" ID $x_t = 1.50$ Baffles @ 2" | 1080 tubes 0.188" OD 0.138" ID $x_t = 1.50$ Baffles @ 3" | 1080 tubes 0.250" OD 0.180" ID $x_t = 1.40$ Baffles @ 4" |
| 7. | 96.05 | 95.82 | 95.87 | 0.456 | 0.053 | 0.019 |
| 10. | 94.61 | 94.36 | 94.41 | 0.691 | 0.08 | 0.028 |
| 15. | 92.23 | 91.96 | 92.03 | 1.135 | 0.132 | 0.047 |
| 20. | 90.92 | 89.60 | 89.67 | 1.755 | 0.192 | 0.069 |
| 30. | 90.28 | 85.18 | 85.00 | 3.559 | 0.34 | 0.123 |
| 50. | 90.63 | 83.74 | 80.00 | 9.197 | 0.851 | 0.287 |
| 70. | 92.11 | 83.76 | 79.21 | 18.28 | 1.596 | 0.538 |
| 80. | 93.09 | 84.02 | 79.21 | 24.73 | 2.055 | 0.691 |
| 85. | 93.26 | 84.23 | 79.06 | 27.74 | 2.311 | 0.774 |
| 90. | 93.11 | 84.57 | 79.34 | 30.81 | 2.588 | 0.865 |
| 100. | 92.84 | 85.27 | 79.70 | 37.38 | 3.195 | 1.061 |
| 130. | 92.05 | 88.09 | 81.52 | 60.55 | 5.549 | 1.785 |
| 140. | 91.80 | 89.34 | 82.20 | 69.39 | 6.517 | 2.072 |
| 150. | 91.56 | 89.09 | 83.15 | 78.79 | 7.41 | 2.39 |
| 180. | 90.86 | 88.39 | 86.24 | 110.23 | 10.43 | 3.532 |
| 190. | 90.84 | 88.16 | 86.71 | 121.79 | 11.54 | 3.917 |
| 200. | 90.42 | 87.94 | 86.48 | 133.87 | 12.71 | 4.316 |
| 210. | 90.20 | 87.72 | 86.25 | 146.47 | 13.92 | 4.734 |
| 300. | 88.34 | 85.93 | 84.37 | 282.96 | 27.19 | 9.304 |
| 600. | — | 82.49 | 80.79 | — | 71.02 | 24.521 |
| 700. | — | 79.44 | 77.64 | — | 133.78 | 46.45 |
| 1,000. | — | — | 73.30 | — | — | 91.41 |

OD = Outside Diameter
ID = Inside Diameter
$x_t$ = diagonal pitch

TABLE 2

| | Overall Efficiency of 40 ft Length | | | Overall Pressure Drop, (psi) | | |
|---|---|---|---|---|---|---|
| Regenerative Flow Rate (GPM) | 1080 tubes 0.125" OD 0.080" ID $x_t = 1.50$ Baffles @ 2" | 1080 tubes 0.188" OD 0.138" ID $x_t = 1.50$ Baffles @ 3" | 1080 tubes 0.250" OD 0.180" ID $x_t = 1.40$ Baffles @ 4" | 1080 tubes 0.125" OD 0.080" ID $x_t = 1.50$ Baffles @ 2" | 1080 tubes 0.188" OD 0.138" ID $x_t = 1.50$ Baffles @ 3" | 1080 tubes 0.250" OD 0.180" ID $x_t = 1.40$ Baffles @ 4" |
| 1. | 99.55 | 99.47 | 98.48 | 0.12 | 0.01 | 0.01 |
| 2. | 99.28 | 99.19 | 99.20 | 0.24 | 0.03 | 0.01 |
| 3. | 99.02 | 98.92 | 98.94 | 0.38 | 0.04 | 0.01 |
| 5. | 98.52 | 98.41 | 96.43 | 0.63 | 0.07 | 0.03 |
| 7. | 98.03 | 97.91 | 97.93 | 0.91 | 0.11 | 0.04 |
| 10. | 97.30 | 97.18 | 97.21 | 1.38 | 0.16 | 0.06 |
| 15. | 96.12 | 95.98 | 96.02 | 2.27 | 0.25 | 0.10 |
| 20. | 95.46 | 94.80 | 94.84 | 3.51 | 0.38 | 0.14 |
| 30. | 95.14 | 92.59 | 92.50 | 7.11 | 0.68 | 0.24 |
| 50. | 95.32 | 91.87 | 90.01 | 18.39 | 1.71 | 0.58 |
| 70. | 96.06 | 91.88 | 89.61 | 36.50 | 3.20 | 1.08 |
| 80. | 96.55 | 92.02 | 89.61 | 49.33 | 4.13 | 1.40 |
| 85. | 96.63 | 92.12 | 89.54 | 55.32 | 4.65 | 1.57 |
| 90. | 96.56 | 92.29 | 89.68 | 61.45 | 5.20 | 1.75 |
| 100. | 96.42 | 92.64 | 89.86 | 74.57 | 6.42 | 2.15 |
| 130. | 96.03 | 94.05 | 90.77 | 120.81 | 11.11 | 3.61 |
| 140. | 95.90 | 94.88 | 91.11 | 138.48 | 13.03 | 4.18 |
| 150. | 95.78 | 94.55 | 91.58 | 157.24 | 14.83 | 4.82 |
| 180. | 95.43 | 94.20 | 93.13 | 220.07 | 20.87 | 7.09 |
| 190. | 95.32 | 94.08 | 93.36 | 243.16 | 23.10 | 7.86 |
| 200. | 95.21 | 93.97 | 93.24 | 267.31 | 25.43 | 8.66 |
| 210. | 95.10 | 93.87 | 93.13 | 292.51 | 27.87 | 9.50 |
| 300. | 94.17 | 92.97 | 92.19 | 565.63 | 54.49 | 18.70 |
| 600. | — | 91.25 | 90.41 | — | 142.71 | 49.43 |
| 700. | — | 89.73 | 88.83 | — | 269.41 | 93.88 |
| 1,000. | — | — | 86.67 | — | — | 185.38 |

OD = Outside Diameter
ID = Inside Diameter
$x_t$ = diagonal pitch

EXAMPLES

To better appreciate the significance of operation within the turbulent flow regime, the following illustration is made. The heat exchanger has baffle plate spacing that is 20% of the diameter of the heat exchanger. If 70° F. water flows into one end such as the tube side of a 40 ft exchanger, or two 20 ft exchangers operating in series, having 1080 ⅛" tubes and an equal quantity of recycle water at 280° F. flows into the opposite end of the exchanger on the shell side, as the flow increases, the efficiency would drop from nearly 100% down to 95% when a flow of 30 gallons/minute is reached. Then something strange would happen. The more the flow was increased, the more efficient the device would become, up to nearly 97% efficiency at a flow of about 90 gallons/minute. This phenomenon is due to the onset of turbulent flow. The turbulence starts at the hot end of the exchanger where the viscosity of the water is the lowest and gradually works back to the cold end as flow velocity is increased. Note that the efficiency of heat exchanger is 10 times greater. It takes 5 times as much heat to heat 100 GPM as to heat 20 GPM in the laminar flow case, but in the case of turbulent flow, 5 times more heat is transferred with a reduced temperature difference. In the turbulent flow case, heat is exchanged at a 97% efficiency or about a 6° F. temperature difference between hot and cold streams vs. a 95% efficiency or about a 10° F. temperature difference between cold and hot streams for the laminar flow case. This demonstrates an unexpectedly advantageous result. This device designed according to the present invention can purify 100 gallons/minute×1440 minutes/day or 144,000 gallons per day or about enough water for 1500 households.

Further variations and modifications of the foregoing will be apparent to those skilled in the art and are intended to be encompassed by the claims appended hereto.

We claim:

1. A radial flow heat exchanger, comprising:
   a) a shell;
   b) a plurality of large circular baffle plates aligned coaxially within the shell and extending to an inner wall of the shell, each of the large baffle plates defining at least one circular hole therein;
   c) a plurality of small circular baffle plates aligned coaxially within the shell, each of the small baffle plates alternately spaced from and coaxially positioned relative to each of the large circular baffle plates; and
   d) a plurality of symmetrically-arranged tubes positioned perpendicularly to the small baffle plates and the large baffle plates forming at least one coaxial tube bundle extending through the plurality of small baffle plates and the plurality of large baffle plates;
   wherein an inner radius of each of the at least one coaxial tube bundles is larger than a radius of the at least one circular hole in the large baffle plate, and an outer radius of the at least one coaxial tube bundle is smaller than a radius of the smaller baffle plates;
   wherein each of the small baffle plates defines with the inner wall of the shell at least one space outside the at least one tube bundle;
   wherein an external heat transfer coefficient is the same or nearly the same for all the interior tubes;
   wherein the tubes form a plurality of concentric, circular tube rows with a same number of tubes in each row; and
   wherein tubes on each successive tube row, proceeding in a direction of increasing radius, are staggered such that a diagonal spacing between each tube and its nearest neighboring tubes in adjacent tube rows is uniform, and a spacing between adjacent tubes on an innermost tube row is less than twice a diagonal distance between the nearest neighboring tubes in adjacent tube rows.

2. The radial flow heat exchanger according to claim 1, wherein the exchanger comprises multiple coaxial tube bundles.

3. The radial flow heat exchanger according to claim 1, wherein the exchanger comprises three coaxial tube bundles.

4. The radial flow heat exchanger according to claim 1, wherein the exchanger comprises seven coaxial tube bundles.

5. The radial flow heat exchanger according to claim 1, wherein a distance between each of the alternating small baffle plates and large baffle plates is less than 40% of a diameter of the heat exchanger.

6. The radial flow heat exchanger according to claim 1, wherein a distance between each of the alternating small baffle plates and large baffle plates is between 15 and 40% of a diameter of the heat exchanger.

7. The radial flow heat exchanger according to claim 1, wherein a distance between each of the alternating small baffle plates and large baffle plates is between 20 and 30% of a diameter of the heat exchanger.

8. The radial flow heat exchanger according to claim 1, wherein a distance between each of the alternating small baffle plates and large baffle plates is 20% of a diameter of the heat exchanger.

9. The radial flow heat exchanger according to claim 1, wherein a distance between each of the alternating small baffle plates and large baffle plates is equal to 10–30 tube diameters.

10. The radial flow heat exchanger according to claim 1, wherein a distance between each of the alternating small baffle plates and large baffle plates is equal to 12–20 tube diameters.

11. The radial flow heat exchanger according to claim 1, wherein a distance between each of the alternating small baffle plates and large baffle plates is equal to 16 tube diameters.

12. The radial flow heat exchanger according to claim 1, wherein the spacing between adjacent tubes on the innermost tube row is the same as the diagonal distance between the nearest neighboring tubes in adjacent tube rows.

13. The radial flow heat exchanger according to claim 1, wherein a distance between each of the alternating small and large baffle plates is such that a tube-side laminar-to-turbulent flow transition and a shell-side laminar-to-turbulent flow transition occur at approximately the same overall flow-rate.

14. The radial flow heat exchanger according to claim 1, wherein a distance between each of the alternating small and large baffle plates is such that a shell-side heat transfer coefficient approximate a tube-side heat transfer coefficient.

15. The radial flow heat exchanger according to claim 1, further comprising a regenerative heating means for heating liquid water flowing through the heat exchanger to a temperature sufficient to kill microorganisms.

16. The radial flow heat exchanger according to claim 1, wherein each of the at least one tube bundles has at least 6 tube rows.

17. The radial flow heat exchanger according to claim 1, wherein the heat exchanger contains a total of at least 30 small and large baffle plates.

18. The radial flow heat exchanger according to claim 1, wherein the heat exchanger comprises sections that operate in series.

19. The radial flow heat exchanger according to claim 1, wherein each tube row contains 40–120 tubes per row.

20. A process for killing pathogenic microorganisms in water, comprising exposing the water containing the pathogenic microorganisms to the radial flow heat exchanger according to claim 1 operated at a temperature sufficient to kill the microorganisms.

21. A process of purifying water which contains organic contaminants or pyrogens, the process comprising:
   heating water in the radial flow heat exchanger according to claim 1 to a temperature sufficient to oxidize the organic contaminants or pyrogens in a catalytic reactor, and
   exposing the heated water to the catalytic reactor to oxidize the organiccontaminants or pyrogens at a temperature sufficient to convert organic materials to an inorganic residue;
   wherein the catalytic reactor comprises a wet oxidation catalyst and a means for supplying sufficient air or oxygen to the water.

22. The process of purifying water according to claim 21, wherein the heat necessary to sustain the heating process is fully or partially available from the heat generated from the oxidizing step.

23. The process of purifying water according to claim 21, further comprising heating the water with a heating means before the oxidizing step.

24. A water treatment apparatus comprising the radial flow heat exchanger according to claim 1.

25. The water treatment apparatus according to claim 24, further comprising:
   a means for supplying air or oxygen to the catalytic reactor, and
   a catalytic reactor positioned in sequence with the heat exchanger,
   wherein the catalytic reactor comprises a suitable wet oxidation catalyst.

26. The water treatment apparatus according in claim 25, wherein the wet oxidation catalyst comprises an alloy of two or more precious metals.

27. The water treatment apparatus according to claim 26, wherein the alloy comprises platinum and ruthenium.

28. The water treatment apparatus according to claim 27, further comprising a heating means positioned between the heat exchanger and the catalytic reactor.

29. A radial flow heat exchanger segment, comprising:
   a) a shell;
   b) a plurality of large circular baffle plates aligned coaxially within the shell and extending to an inner wall of the shell, each of the large baffle plates defining at least one circular hole therein;
   c) a plurality of small circular baffle plates aligned coaxially within the shell, each of the small baffle plates alternately spaced from and coaxially positioned relative to each of the large circular baffle plates; and
   d) a plurality of symmetrically-arranged tubes positioned perpendicularly to the small baffle plates and the large baffle plates forming at least one coaxial tube bundle extending through the plurality of small baffle plates and the plurality of large baffle plates;
   wherein an inner radius of each of the at least one coaxial tube bundles islarger than a radius of the at least one circular hole in the large baffle plate, and an outer radius of the at least one coaxial tube bundle is smaller than a radius of the smaller baffle plates;
   wherein each of the small baffle plates defines with the inner wall of the shell at least one space outside the at least one tube bundle;
   wherein an external heat transfer coefficient is the same or nearly the same for all the interior tubes;
   wherein the tubes form a plurality of concentric, circular tube rows with a same number of tubes in each row; and
   wherein tubes on each successive tube row, proceeding in a direction of increasing radius, are staggered such that a diagonal spacing between each tube and its nearest neighboring tubes in adjacent tube rows is uniform, and a spacing between adjacent tubes on an innermost tube row is less than twice a diagonal distance between the nearest neighboring tubes in adjacent tube rows.

30. The radial flow heat exchanger segment according to claim 29, wherein the exchanger segment comprises multiple coaxial tube bundles.

31. The radial flow heat exchanger segment according to in claim 29, wherein the exchanger segment comprises three coaxial tube bundles.

32. The radial flow heat exchanger segment according to in claim 29, wherein the exchanger segment comprises seven coaxial tube bundles.

33. The radial flow heat exchanger segment according to claim 29, wherein a distance between each of the alternating small baffle plates and large baffle plates is less than 40% of a diameter of the heat exchanger segment.

34. The radial flow heat exchanger segment according to claim 29, wherein a distance between each of the alternating small baffle plates and large baffle plates is between 15 and 40% of a diameter of the heat exchanger segment.

35. The radial flow heat exchanger according to claim 29, wherein a distance between each of the alternating small baffle plates and large baffle plates is between 20 and 30% of a diameter of the heat exchanger segment.

36. The radial flow heat exchanger segment according to claim 29, wherein a distance between each of the alternating small baffle plates and large baffle plates is 20% of a diameter of the heat exchanger segment.

37. The radial flow heat exchanger segment according to claim 29, wherein a distance between each of the alternating small baffle plates and large baffle plates is equal to 10–30 tube diameters.

38. The radial flow heat exchanger segment according to claim 29, wherein a distance between each of the alternating small baffle plates and large baffle plates is equal to 12–20 tube diameters.

39. The radial flow heat exchanger segment according to claim 29, wherein a distance between each of the alternating small baffle plates and large baffle plates is equal to 16 tube diameters.

40. The radial flow heat exchanger segment according to claim 29, wherein the spacing between adjacent tubes on the innermost tube row is the same as the diagonal distance between the nearest neighboring tubes in adjacent tube rows.

41. The radial flow heat exchanger segment according to claim 29, wherein a distance between each of the alternating small and large baffle plates is such that a tube-side laminar-to-turbulent flow transition and a shell-side laminar-to-turbulent flow transition occur at approximately the same overall flow-rate.

42. The radial flow heat exchanger segment according to claim 29, wherein a distance between each of the alternating small and large baffle plates is such that a shell-side heat transfer coefficient approximates a tube-side heat transfer coefficient.

43. The radial flow heat exchanger according to claim 1, wherein a tube-side flow and a shell-side flow are each a turbulent flow.

44. The radial flow heat exchanger segment according to claim 29, wherein a tube-side flow and a shell-side flow are each a turbulent flow.

45. The process according to claim 21, further comprising a step following the heating water step of adding air or oxygen to the water.

* * * * *